May 13, 1952     W. E. KOCK     2,596,251
WAVE GUIDE LENS SYSTEM
Filed Oct. 1, 1948     4 Sheets-Sheet 1
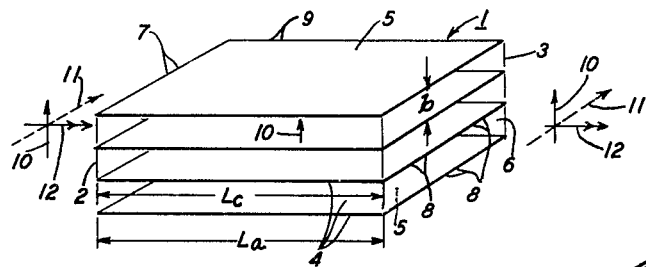
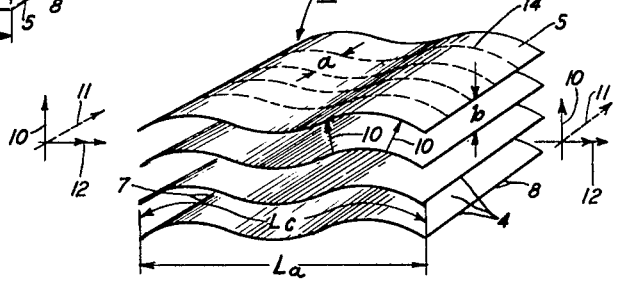
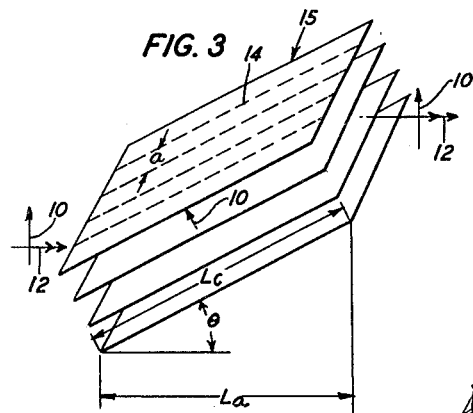
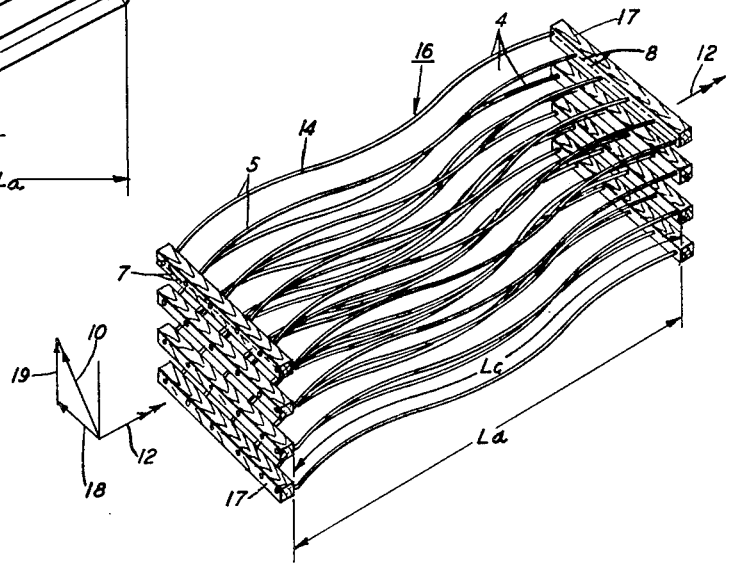
INVENTOR
*W. E. KOCK*
BY
*A. J. Zerbarini*
ATTORNEY

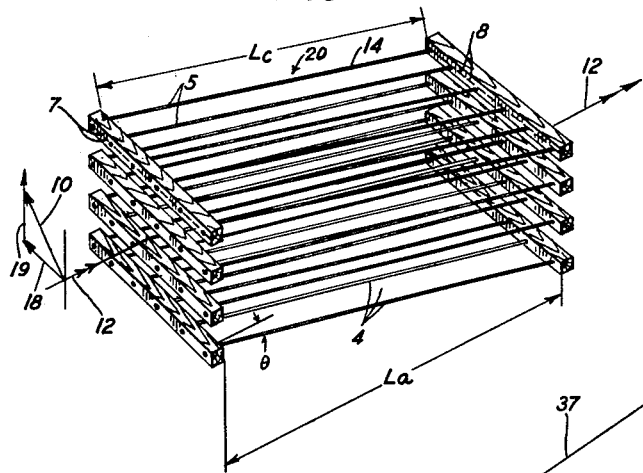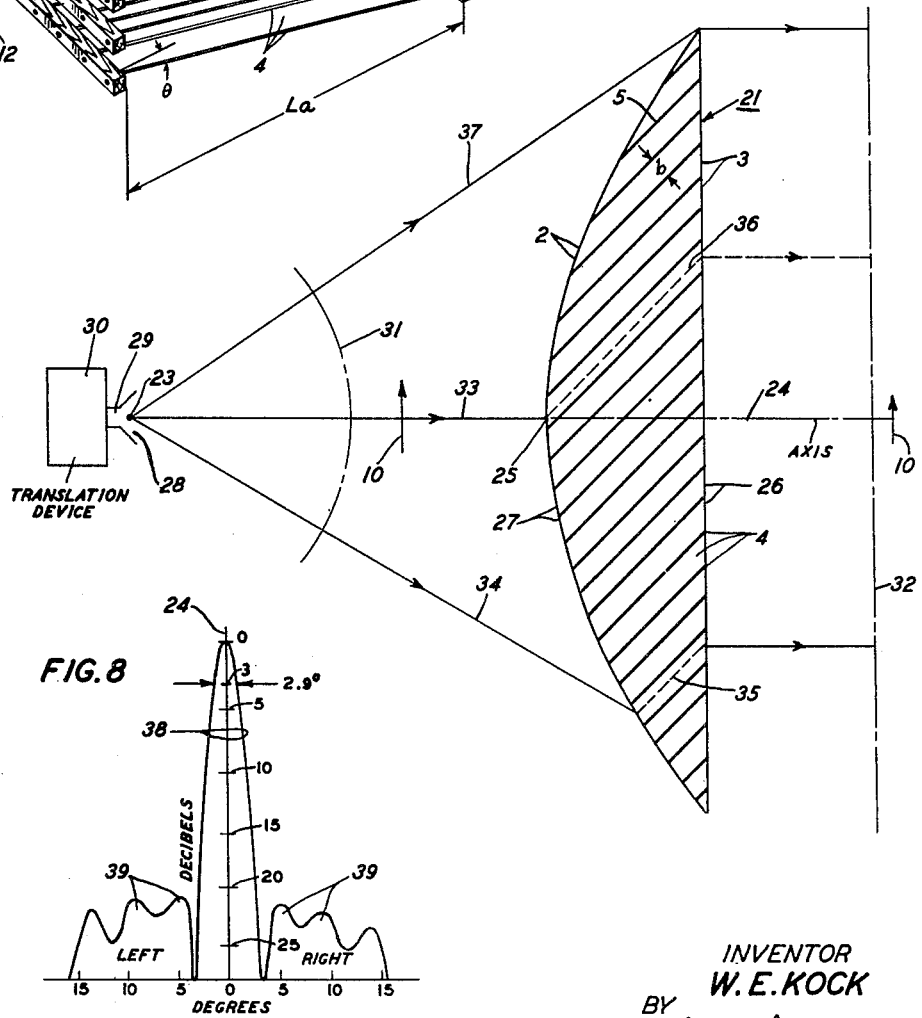

May 13, 1952     W. E. KOCK     2,596,251
WAVE GUIDE LENS SYSTEM
Filed Oct. 1, 1948     4 Sheets-Sheet 3
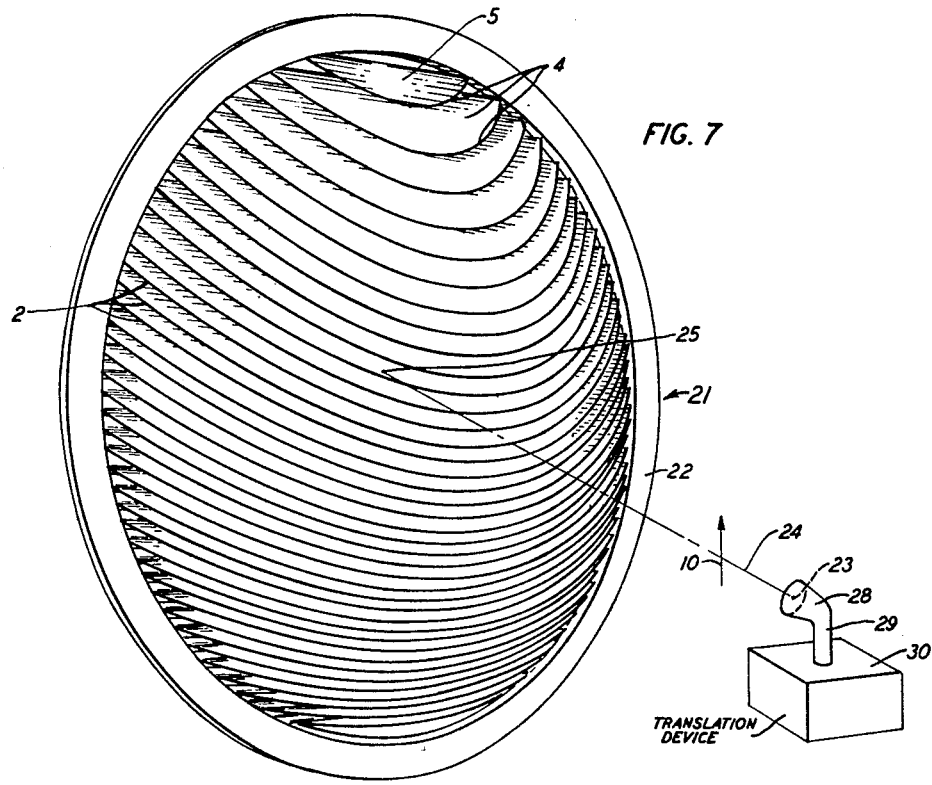
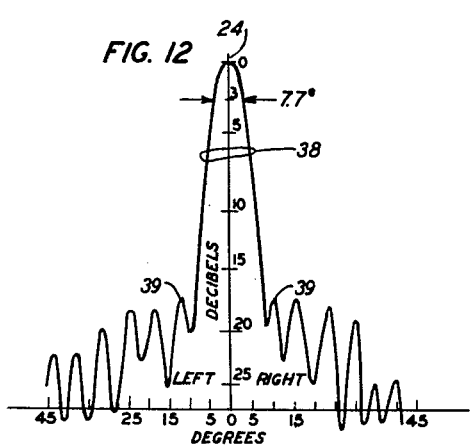
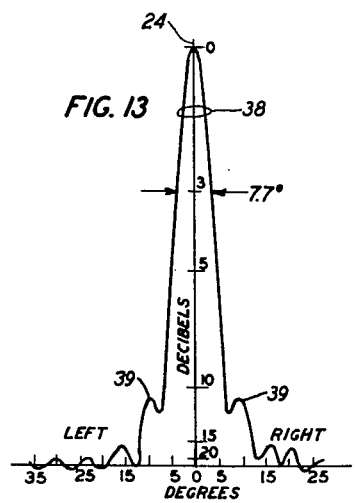
INVENTOR
W. E. KOCK
BY
A. J. Zerbarini
ATTORNEY

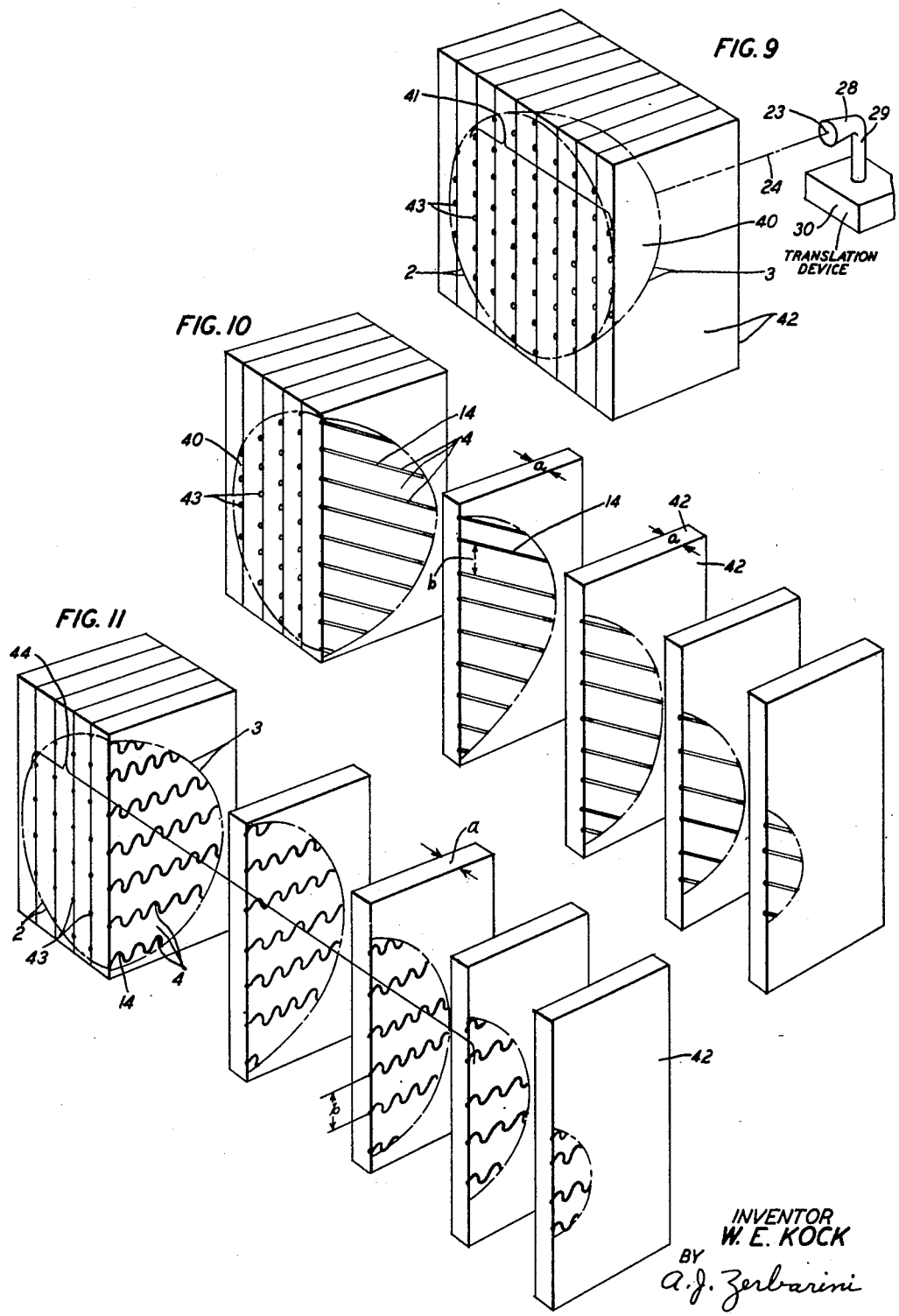

Patented May 13, 1952

2,596,251

UNITED STATES PATENT OFFICE 2,596,251

WAVE GUIDE LENS SYSTEM

Winston E. Kock, Basking Ridge, N. J., assignor to Bell Telephone Laboratories, Incorporated, New York, N. Y., a corporation of New York Application October 1, 1948, Serial No. 52,349

10 Claims. (Cl. 250—33.63)

This invention relates to methods and means for changing the phase velocity of transverse waves and in particular to metallic phase delay structures or mediums suitable for use in electromagnetic wave changers including refractors.

As is known, metallic structures are utilized in radio wave changers, such as polarization shifters, polarization circularizers, lens and prisms, for the purpose of accelerating or retarding the phase velocity of the wave components propagated through the wave changer. Thus Fig. 15 of Patent 2,283,935, granted to A. P. King on May 26, 1942, and my four copending applications Serial Nos. 642,722 and 642,723, both filed January 22, 1946, and Serial Nos. 660,337 and 660,338, both filed on April 8, 1946, disclose metallic refractors of the phase-advance type; and my copending applications Serial Nos. 748,447 and 748,448, both filed on May 16, 1947, disclose metallic refractors of the phase-delay type. My above-mentioned copending applications Serial Nos. 642,722, filed January 22, 1946; 660,338, filed April 8, 1946; 748,447, filed May 16, 1947, and 748,448, filed May 16, 1947 have matured into Patents 2,588,249, granted March 4, 1952; 2,562,277, granted July 31, 1951; 2,579,324, granted December 18, 1951; and 2,577,619, granted December 4, 1951, respectively. In general, in the above-mentioned phase-advance refractors, the structure or medium utilized for accelerating the phase velocity is a dielectric channel comprising plates extending parallel to the electric vector. Since in these structures the refractive index, smaller than unity, of the channel is a function of the plate spacing, as measured in wavelengths, the bandwidth of the structure is relatively narrow. In the phase-delay refractors, the structure or medium utilized to retard the phase velocity comprises metallic elements dispersed in a dielectric medium, and the refractive index, greater than unity, is a function of the size of the elements measured in wavelengths. Hence, the index, although constant over a fairly wide frequency band, changes as the element approaches resonance so that the bandwidth of the refractor is limited to some extent. Accordingly, while the structures of my copending applications have been successfully used, it now appears desirable to obtain a phase changing structure or medium which possesses distinct advantages over the metallic phase changing structures heretofore employed and at the same time is devoid of the disadvantages inherent in the prior art metallic structures.

It is a broad object of this invention to obtain, in a metallic phase changing structure or medium, a constant refractive index over an extremely wide frequency band.

It is a specific object of this invention to delay the phase velocity of a radio wave included in a very wide frequency band in an efficient manner and without substantial loss.

It is a more specific object of this invention to obtain, in a metallic refractor for transverse waves, a refractive index which is constant over a frequency band having a width greater than the usable bandwidth of metallic refractors heretofore utilized.

It is a different object to obtain, as a manufacture and a machine, a simple, lightweight inexpensive electromagnetic lens.

In accordance with one embodiment of the invention, the phase delay medium or structure comprises a plurality of dielectric channels each comprising a pair of flat parallel conductive walls and the air dielectric included therebetween. The adjacent walls are spaced less than a half wavelength apart for the purpose of preventing second and higher modes. The transverse, that is, the front and back, edges of each wall extend perpendicular to the electric vector of the radio wave incoming to and outgoing from, the structure. Also, the length or depth dimension of each channel or, stated differently, each longitudinal wall dimension, forms an acute angle $\theta$ with the propagation direction of the wave incoming to, and outgoing from the structure, whereby the length of the propagation path in each channel is greater than the distance between the front and back faces of the structure. In operation, the phase velocity of the wave conveyed in each channel and arriving at the back face of the structure is not affected by the wall spacing or so-called $b$ dimension of the channel. The phase velocity of the electric component of the wave is retarded, however, by reasons of the refraction of the component by the channel, and the length or depth of the channel relative to the phase velocity of a wave component included in the same incoming wave front and propagated outside, and between the front and back faces, of the structure. More specifically, the delay effected is a function of the aforesaid acute angle and the channel depth, and the structure has an effective refractive index greater than unity and equal to the reciprocal of the cosine of said angle. The wall spacing mentioned above, while imposing a mode limitation on the structure, does not impose a frequency limitation, and the structure has an exceedingly wide bandwidth.

The above described structure comprising inclined or slant walls may be shaped or dimensioned to form an electromagnetic polarization shifter or an electromagnetic polarization circularizer. Again, it may be shaped to form an electromagnetic non-focussing refractor or prism or an electromagnetic focussing refractor such as a cylindrically symmetrical delay lens having a line focus or a circularly-symmetrical delay lens having a point focus. Preferably, when shaped to form a circularly-symmetrical delay lens, the lens face toward the point focus is convex and has a hyperboloidal contour and the face away from the focus is plane. Also each conductive wall may be a "plate," that is, a single continuous metallic sheet, or it may be a "grid," that is, a plurality of wires spaced less than a half wavelength apart and extending perpendicular to the transverse edges of the walls.

A circularly-symmetrical or point-focus lens, comprising slant plates and utilized for focussing longitudinal non-polarized acoustic waves and transverse acoustic waves, is disclosed and claimed in my concurrently filed copending application Serial No. 52,350, filed October 1, 1948. While the acoustic lens just described and the circularly-symmetrical plate-type electromagnetic lens described above are identical in structure, the delay operations of these two lenses are entirely different. To illustrate, in the electromagnetic lens the walls must have a particular orientation relative to the electric polarization of the wave whereas in the acoustic lens this requirement is obviated since, in general, acoustic waves are not polarized.

The invention will be more fully understood from the following specification taken in conjunction with the drawing on which like reference characters denote elements of similar function and on which:

Fig. 1 is a perspective view of a structure comprising dielectric channels each constructed in accordance with the invention;

Fig. 2 is a perspective view of a phase delay structure or medium constructed in accordance with the invention;

Fig. 3 is a perspective view of a different phase delay structure constructed in accordance with the invention;

Fig. 4 is a perspective view of a polarization shifter or circularizer constructed in accordance with the invention;

Fig. 5 is a perspective view of a different polarization shifter or circularizer constructed in accordance with the invention;

Figs. 6 and 7 are respectively a side sectional view and a perspective view of a system comprising a circularly-symmetrical plano-convex plate lens constructed in accordance with the invention, and Fig. 8 is a measured directive pattern for the system of Figs. 6 and 7;

Fig. 9 is a perspective view of a system comprising a circularly-symmetrical grid lens constructed in accordance with the invention and Fig. 10 is an exploded view of the lens included in Fig. 9.

Fig. 11 is an exploded view of a different circularly symmetrical grid lens constructed in accordance with the invention.

Fig. 12 is a measured directive pattern for a system comprising the lens of Fig. 9, and Fig. 13 is a measured pattern for a system comprising the lens of Fig. 11.

Referring to Fig. 1, there is shown a structure 1 having a front face 2, a back face 3, and comprising three dielectric channels 4 each comprising a pair of flat conductive walls 5 of the plate-type and a dielectric 6, air, included therebetween. The walls are spaced a distance $b$ equal to a half wavelength, taken at the shortest wavelength in the operating band. Numerals 7 and 8 denote respectively the front transverse edges and the back transverse edges of the plates 5, and numerals 9 denote the longitudinal edges of the plates. The plates extend perpendicular to the electric or E vector 10, and hence parallel to the magnetic or H vector 11, of the wave having a propagation path 12, incoming to, and outgoing from, the structure 1. Since the longitudinal edges 9, and hence the channels 4, are parallel to the propagation path 12, the depth or length $L_c$ of each channel is equal to the distance $L_a$, taken in space, between the front and back faces 2 and 3 of structure 1.

In operation, Fig. 1, the phase velocity of the incoming electric vector 10 is not changed by reason of the plate spacing $b$. Also, since the plates are perpendicular to the electric vector 10 or, stated more accurately, since the channel depth $L_c$ equals the space distance $L_a$, the phase velocity of the electric vector of the wave components conveyed through the structure 1 is not changed relative to the phase velocity of the "space" components traversing the distance $L_a$ outside of the structure and hence the channels 4 do not function to produce a relative phase velocity delay. Inasmuch as the plate spacing $b$ is smaller than a half wavelength, the second and higher modes of vector 10 are not transmitted through the structure 1.

Referring to Fig. 2, the structure 13 is the same as the structure 1, except that the walls or plates 5 have a simusoidal or serpentine contour, whereby the depth $L_c$ of each channel 4 is greater than the distance $L_a$.

In operation, Fig. 2, the electric vector 10 passing through each sinusoidal channel 4 is at all times perpendicular to the plates 5. Since $L_c$ is greater than $L_a$, the phase velocity of the electric vector arriving at the back face 2 of the structure 13 is delayed relative to that of the electric vector of the space components traversing the distance $L_a$, the delay corresponding to $L_c-L_a$. Since the refractive index $n$ is the ratio of the velocity in the medium to the velocity in free space, the refractive index is $$\frac{L_c}{L_a}$$

The serpentine structure 13 accordingly constitutes a refractive medium and, as explained below, by properly shaping the structure or medium 13, refractors such as lenses and prisms may be obtained.

As shown by the dotted lines 14 in the top wall 5, Fig. 2, instead of plates, the walls 5 may if desired be grids each comprising wires extending parallel to the longitudinal edges 9 of the walls 5 and spaced a distance $a$ less than a half wavelength taken at the shortest wavelength in the band, whereby waves in the band and passing through the structure 13 are confined to the separate channels. The structure comprising grid walls constitutes a birefringent medium because waves of different electric polarization are affected differently by the structure. More specifically, waves having their electric vector parallel to the transverse edges 7, 8 of the walls pass through the structure unaffected, whereas waves having their electric vector perpendicular to the transverse edges of the grids are delayed. If plates, instead of grids, are used, waves having their electric vectors perpendicular to the transverse plate edges are delayed, as explained above, but waves having their electric vector parallel to the plate transverse edges are reflected by reason of the plate spacing $b$. In short, for the parallel E vector, the grids do not, but the plates do, constitute channel or guide walls. It follows, as explained below, that the grid walls, but not the plate walls, may be utilized in polarization shifters and polarization circularizers.

Referring to Fig. 3, the structure 15 is the same as the structure 1, Fig. 1, except that the walls 5 extend at an acute angle $\theta$ to the propagation direction 12. The front and back transverse edges 7, 8 of each wall are, however, perpendicular to the incoming electric vector 10. In the slant structure 15, the length $L_c$ of each channel 4 is greater than the space path $L_a$ outside the structure so that the electric vector 10 of the conveyed wave components is delayed relative to the electric vector of the space components. The delay is a function of both the angle $\theta$ and the channel length or depth $L_c$, that is, the refractive index $n$ is equal to $$\frac{1}{\cos \theta} \tag{1}$$

The electric vector 10 conveyed in the slant channels 4 is, as in Fig. 2, perpendicular in each channel to the slant plates 4. As shown by the dotted lines 14 in the top slanting wall 5 of structure 15, instead of plates, the walls 5 may be grids each comprising wires spaced less than a half wavelength apart.

The sinusoidal plate structure 13 and the slant plate structure 15 have an exceedingly large bandwidth characteristic since the wall spacing limits the mode but not the frequency of the propagated wave. The bandwidth of the grid structures is, however, not as large since the spacing between the wires of each grid limits the operating frequency.

Referring to Fig. 4, the sinusoidal structure 16 is essentially the same as the sinusoidal structure 13, Fig. 2, except that the walls are grids. The wires 14 of each grid 5 are supported by the wooden strut members 17 coincident with the transverse grid edges represented by the dotted lines 7, 8. The transverse grid edges and struts 17 are positioned at an angle of 45 degrees relative to the incoming electric vector 10, and the channel length $L_c$ is critically selected as explained below. In operation, the parallel component 18 of electric vector 10 passes through the structure without relative delay, whereas the vertical component 19 is delayed relative to the parallel component 18 an amount dependent upon the difference between the channel length $L_c$ and the space path length $L_a$, that is, $L_c-L_a$. Assuming first that $L_c$ is a quarter wavelength greater than $L_a$, at the back face 2 of structure 16 the perpendicular component 19 is delayed 90 degrees relative to the parallel component 18 and, since these components are in space quadrature, a circularly polarized wave is secured. Assuming now that $L_c$ is a half wavelength greater than $L_a$, the perpendicular component 19 is delayed 180 degrees relative to the parallel component 18, that is, the polarity of the perpendicular component is reversed, whereby the polarization of the wave outgoing from structure 17 is perpendicular to the polarization of the wave incoming to structure 17. Hence dependent upon whether $$L_c - L_a = \frac{\lambda_0}{4} \tag{2}$$

or $$L_c - L_a = \frac{\lambda_0}{2} \tag{3}$$

where $\lambda_0$ is the space wavelength, the structure 16 functions, respectively, as a polarization circularizer or a polarization shifter.

Referring to Fig. 5, the slant wall structure 20 is the same as the slant wall structure 15 of Fig. 3, except that the walls are grids and, as in Fig. 4, the transverse edges 7, 8 of the walls extend at an angle of 45 degrees relative to the incoming electric vector 10. As in the previous structure, dependent upon whether $L_c-L_a$ has the value given by Equation 2 or the value given by Equation 3 the slant grid structure functions, respectively, as a polarization circularizer or a polarization shifter.

Referring to Figs. 6 and 7, numeral 21 denotes a circularly-symmetrical plano-convex lens formed of a delay medium or structure similar to that illustrated by Fig. 3 and comprising slant channels 4 each comprising a pair of slant conductive walls 5 of the plate type. The plates are held in position by the wooden ring member 22. As in Fig. 3, the walls are spaced less than a half wavelength apart. The lens has a point focus 23 and an optical axis 24 passing through focus 23 and the vertex 25 of the lens. The plane front face 26 of the lens corresponding to the front face 2 of the structure 15, Fig. 3, faces away from the focus 23, and the back convex lens surface 27 faces towards the focus. The curvature of the convex face 27 is, as in the delay lens disclosed in my copending applications Serial Nos. 748,447 and 748,448 mentioned above, hyperboloidal. Numeral 28 denotes a point-type primary antenna, such as a conical horn, positioned at the focus and connected by a wave guide 29 to a translation device 30 which may be a transmitter, a receiver or a transceiver.

In operation, Figs. 6 and 7, assuming device 30 is a transmitter and waves having a circular front 31 in each plane containing the axis 24 are emitted by the horn 28, the lens functions to convert in each axial plane the circular front to a substantially linear front 32. Considered in the solid, the lens functions to convert the outgoing spherical wave front to a plane wave front. More particularly, in the E plane illustrated by Fig. 6, the focussing action is obtained, considering for purpose of explanation two of the slant channels 4, by reason of the critically selected difference in the two channel lengths $L_c$. Thus, for example, the two rays or wavelets 33 and 34 having different radial directions are propagated through two channels 4 having different lengths, as shown by the dotted lines 35 and 36. The total lengths, however, of the two paths extending from the focus 23 to the plane lens face 26 and traversed by wavelets 33 and 34 are equal, and similarly the total lengths of the paths for all channels 4 are equal, whereby the wavelets arrive cophasal at the plane lens face 26. In the H plane perpendicular to the E plane, considering any one of the channels 4, the lens action is obtained primarily by reason of the convex curvature, Fig. 7, of the back face 27 and the resulting variation, in the H plane, of the length or depth of the channel. In reception, a reciprocal action is obtained and the lens functions to focus the incoming wavelets on the horn 28.

A measured directive pattern taken at a wavelength of 3.3 centimeters for a system comprising a lens having a diameter of 30 inches and constructed in accordance with Figs. 6 and 7 is illustrated in Fig. 8. In the tested structure the plates were inclined at an angle of 48.2 degrees corresponding to a refractive index of 1.5, and the plate spacing was one-half inch so that from a mode suppression standpoint, the tested lens was particularly useful for waves equal to and greater than 2.54 centimeters. As shown in Fig. 8, the major lobe 38 is narrow, the half-power width being 2.9 degrees, and the minor lobes 39 are negligible. The E plane pattern (not shown) of the lens of Figs. 6 and 7, while not entirely symmetrical because the slanted plates cause an unsymmetrical distribution of the energy across the front face of the lens, is nevertheless highly satisfactory.

The use of air, rather than a solid substance, as the dielectric in the plate lens shown in Figs. 6 and 7, as well as in the grid wave changers of Figs. 4 and 5, is especially advantageous in systems wherein wind pressure on structures of solid construction is objectionable. For lightweight solid construction, polystyrene foam slabs may be used between the walls and the plate-type walls may be formed of very thin metallic foil. Polystyrene foam is very light, weighing only one or two pounds per square foot, and yet exceedingly strong, and microwaves propagated through it are attenuated only a negligible amount.

Referring to Figs. 9 and 10, the plano-convex circularly symmetrical delay lens 40 comprises slant grid walls 41 each comprising wires 14. As shown in the exploded view of Fig. 10, the vertically aligned wires 14 of the different walls 5 are embedded on the side of a slab 42 of polystyrene foam having a thickness or "a" dimension of less than a half wavelength. As indicated in Fig. 9, the slabs are assembled to form the lens 40, and, in an actual structure, only the ends 43 of the slant wires included in the plane face 26 of the lens are visible.

As shown in the exploded view of Fig. 11, instead of slant grid walls 41, sinusoidal grid walls 44 may be employed in the lens 40 shown in Fig. 9. Again, in the actual structure, only the ends or tips of the sinusoidal wires are visible, so that Fig. 9 illustrates in perspective both the slant grid lens (Fig. 10) and the sinusoidal grid lens (Fig. 12).

The slant delay lens of Figs. 9 and 10 and the sinusoidal delay lens of Figs. 9 and 11 operate to transform a spherical wave front to a plane wave front, and vice versa, as explained in connection with Figs. 6 and 7. Fig. 12 illustrates a measured magnetic plane pattern, taken at 7 centimeters, for a slant grid lens constructed in accordance with Figs. 9 and 10 and Fig. 13 illustrates a measured magnetic pattern, taken at 3 centimeters, for a sinusoidal grid lens constructed in accordance with Figs. 9 and 11. The slant grid lens tested had a diameter of two feet and a slant angle θ of 45 degrees corresponding to a refractive index of 1.414. The sinusoidal grid lens tested had a diameter of 8 inches. As shown in Figs. 12 and 13, the major lobes 38 of the pattern are relatively narrow.

Although the invention has been described in connection with certain embodiments it should be understood that it is not to be limited to the embodiments described inasmuch as other apparatus may be employed in successfully practicing the invention. Thus, instead of sinusoidal channels, channels having zig-zag, or other, configurations may be used.

What is claimed is:

1. A refractor for a wide range of linearly polarized, high frequency, electromagnetic waves having a predetermined direction of propagation, said refractor comprising a plurality of conductive, parallel, electromagnetic wave reflecting members, said members being spaced in the direction of polarization at substantially equal intervals, each of said intervals being not greater than one-half wavelength of the highest frequency of said frequency range, a first boundary of each of said members being a straight line, all of the said first boundaries being perpendicular to the direction of polarization and lying in and defining a plane surface perpendicular to said direction of propagation, each of said members having a second smooth boundary opposite said first boundary in the said direction of propagation, the said second smooth boundaries of all said members lying in and defining a second smooth surface of said refractor, said members defining a plurality of wave-guide channels comprising the spaces between each adjacent couple of said members, all of said members being disposed in like angular relation with respect to said direction of propagation, each of said wave-guide channels having a length, measured along its longitudinal center line from said plane surface to said smooth surface greater than the straight-line distance between said surfaces measured parallel to said direction of propagation through the mid-point of the channel being measured, whereby said refractor acquires, for the said waves, the electrical properties of a dielectric material having a dielectric constant greater than unity.

2. The structure of claim 1, in which each of said reflecting members is a sheet of conductive material.

3. The structure of claim 2, in which the said smooth surface is a circularly symmetrical convex surface.

4. The structure of claim 2, in which the said smooth surface is a circularly symmetrical convex hyperbolically curved surface.

5. The structure of claim 1, in which each of the said reflecting members is a grid of straight parallel conductive wires, the distance between adjacent wires not exceeding one-half wavelength of the shortest wavelength of said wide range, each wire lying in a plane which is parallel to the direction of propagation.

6. The structure of claim 5, in which the said smooth surface is a circularly symmetrical convex surface.

7. The structure of claim 5, in which the said smooth surface is a circularly symmetrical hyperbolically curved convex surface.

8. The structure of claim 5, in which each of the said reflecting members is a grid of parallel conductive wires having like curvatures, the distance between adjacent wires not exceeding one-half wavelength of the shortest wavelength of said wide range, each wire lying in a plane which is parallel to the direction of propagation.

9. The structure of claim 8, in which said smooth surface is a circularly symmetrical convex surface.

10. The structure of claim 8, in which said smooth surface is a circularly symmetrical hyperbolically curved convex surface.

WINSTON E. KOCK.

REFERENCES CITED

The following references are of record in the file of this patent:

UNITED STATES PATENTS

| Number | Name | Date |
|---|---|---|
| 2,129,669 | Bowen | Sept. 13, 1938 |
| 2,283,935 | King | May 26, 1942 |
| 2,411,872 | Feldman | Dec. 3, 1946 |
| 2,415,807 | Barrow | Feb. 18, 1947 |
| 2,425,488 | Peterson et al. | Aug. 12, 1947 |
| 2,442,951 | Iams | June 8, 1948 |
| 2,447,768 | Mueller | Aug. 24, 1948 |
| 2,461,005 | Southworth | Feb. 8, 1949 |
| 2,464,269 | Smith | Mar. 15, 1949 |
| 2,473,613 | Smith | June 21, 1949 |
| 2,508,479 | Wheeler | May 23, 1950 |
| 2,511,610 | Wheeler | June 13, 1950 |
| 2,528,582 | De Vore | Nov. 7, 1950 |

FOREIGN PATENTS

| Number | Country | Date |
|---|---|---|
| 598,493 | Great Britain | Feb. 19, 1948 |
| 598,494 | Great Britain | Feb. 19, 1948 |